Figure 1:
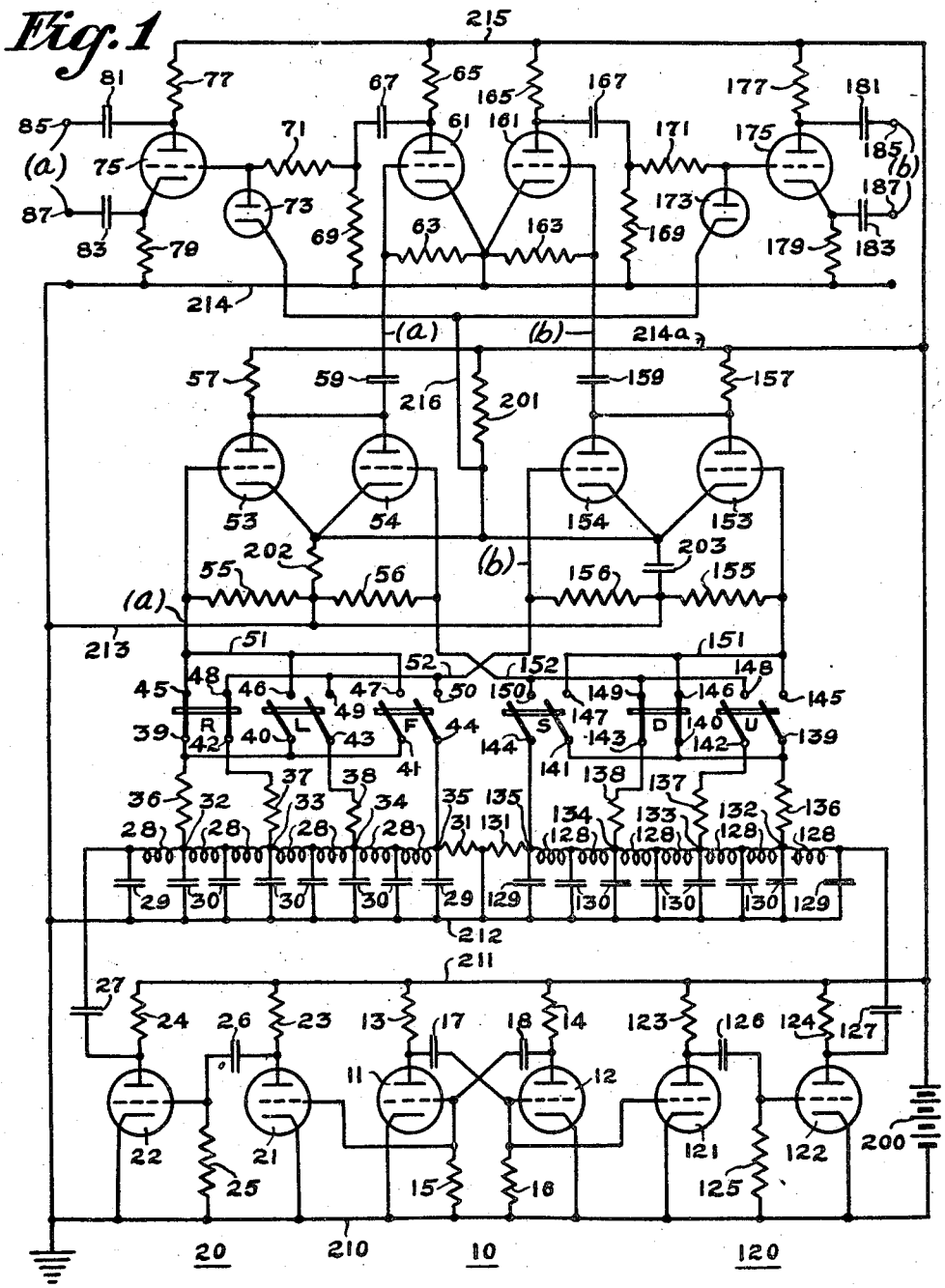

July 29, 1947.  E. S. PURINGTON  2,424,900
MULTIPLEX CONTROL SYSTEM
Filed Aug. 2, 1944  3 Sheets-Sheet 1

INVENTOR
ELLISON S. PURINGTON.
BY
ATTORNEY

July 29, 1947. E. S. PURINGTON 2,424,900
MULTIPLEX CONTROL SYSTEM
Filed Aug. 2, 1944 3 Sheets-Sheet 2
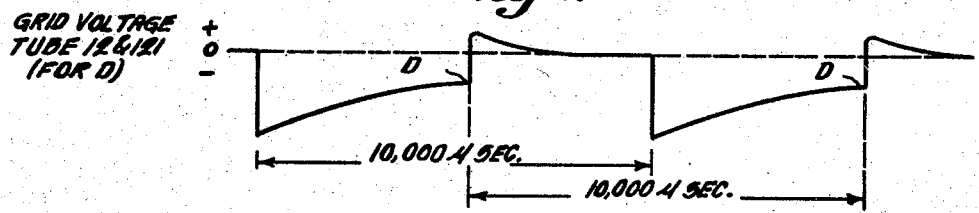
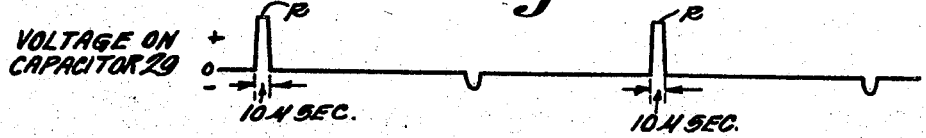
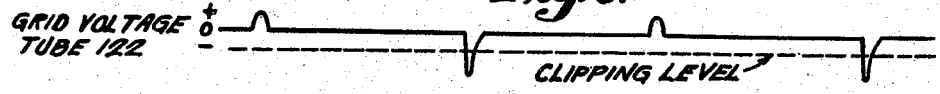
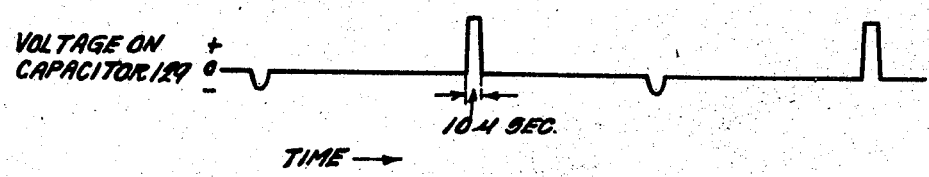
INVENTOR.
ELLISON S. PURINGTON
BY H. G. Grover
ATTORNEY July 29, 1947.  E. S. PURINGTON  2,424,900
MULTIPLEX CONTROL SYSTEM
Filed Aug. 2, 1944  3 Sheets-Sheet 3

INVENTOR.
ELLISON S. PURINGTON
BY H.S. Grover
ATTORNEY

Patented July 29, 1947

2,424,900

UNITED STATES PATENT OFFICE 2,424,900

MULTIPLEX CONTROL SYSTEM

Ellison S. Purington, Gloucester, Mass., assignor, by mesne assignments, to Radio Corporation of America, New York, N. Y., a corporation of Delaware Application August 2, 1944, Serial No. 547,730

10 Claims. (Cl. 177—380)

This invention relates to a signalling or control system responsive to recurrent pairs of pulses having predetermined time intervals between the individual pulses of each pair. The two pulses of each pair are propagated over different channels and signalling or control is effected by selecting the pulse sequence on the two channels and by selecting the intervals between pulses of each pair. One such system is set forth in my copending application Ser. No. 537,799, filed May 29, 1944, for Radio control system (H-777) wherein pulses are produced having 50, 100 or 150 microseconds delay between the pulses of each pair and provision is made to select the channel to be pulsed first. In this way six different controls are obtained although the number may be increased as desired.

The present invention provides a multiplex control system in which two such controls are obtained simultaneously. The controls may, for example, comprise "left" or "right" rudder, "up" or "down" and "flash" and "secure." One control of each group may be sent simultaneously with one control from the other group, i. e., "left and up," "right and up," "left and down," "right and down," so that all possible navigational changes are provided for. The additional controls, such as "flash" and "secure" may be used when navigational controls are not required. For example "flash" may refer to the turning on of a light signal, and "secure" to locking of the course against further radio control.

In one embodiment this is accomplished by interleaving the pairs corresponding to the selected control sequences. For example, "right" rudder may be responsive to a pulse $a$ on channel $f_1$ followed in 50 microseconds by a pulse $b$ on channel $f_2$, "left" rudder to pulse $a$ on channel $f_1$ followed in 100 microseconds by pulse $b$ on channel $f_2$ and "flash" to pulse $a$ on channel $f_1$ followed in 150 microseconds by pulse $b$ on channel $f_2$. Similarly "up," "down" and "secure" may be responsive to the reverse sequences with the pulse $a$ on channel $f_2$ preceding the pulse $b$ on channel $f_1$ by 50, 100 or 150 microseconds.

The multiplex interleaved control according to the present invention is obtained by sending a pair of pulses having for example the "left" sequence followed by another pair of pulses having for example the "up" sequence in an alternating series. The receiver segregates the two sets of pulses and actuates the control circuits in accordance therewith.

The invention will be better understood by referring to the following description, taken in connection with the accompanying drawings in which a specific embodiment has been set forth for purposes of illustration.

In the drawing Figure 1 is a schematic diagram of a transmitting circuit embodying the invention, Figures 2 to 7 inclusive are pulse diagrams which illustrate the procedure for deriving the pulses for controls R and D from the rapid variations of grid voltage in two triodes of a multivibrator, Figures 8 to 11 inclusive are pulse diagrams which illustrate the manner in which time delay circuits provide two time separated pulses from a single pulse, Figures 12 and 13 are pulse diagrams which illustrate pulses which are combined and Figure 14 is a pulse diagram which illustrates the combined propagated pulses. Similar reference characters are applied to similar elements throughout the drawings. The pulse diagrams have exaggerated scales only for the purpose of facilitating an understanding of the operation of the device.

In Figure 1, a multivibrator 10 determines the rate of recurrence of the pairs of pulses and causes the pairs of pulses for one set of operations to occur at different time from the other pairs of pulses for the other operation. This multivibrator comprises two triodes 11, 12, the cathodes of which are connected by a line 210 to the grounded negative end of a driving battery 200, and the anodes of which are connected to the positive side of battery 200 through resistors 13, 14 respectively and line 211. Resistors 15 and 16 are connected from the grids of triodes 11 and 12 to ground lead 210 and condensers 17, 18 are connected respectively from the plate of each triode to the grid of the other triode.

A pulse forming and amplifying circuit 20 comprises two triodes 21 and 22, with cathodes connected to the negative lead 210, and with anodes connected through resistors 23 and 24 to positive lead 211. A resistor 25 is connected from the grid of triode 22 to ground lead 210, a condenser 26 is connected from the anode of triode 21 to the grid of triode 22 and one end of an output condenser 27 is connected to the plate of triode 22.

The constants of the multivibrator circuit 10 are so chosen that the multivibrator oscillates for example at a fundamental rate of 100 vibrations per second. Referring to Figs. 2 and 3, at the instant tube 11 starts to draw current due to the grid potential rising from a value below cutoff to a more positive but still negative value, the plate voltage of tube 11 is lowered due to the voltage drop in resistor 13, which due to the coupling condenser 17 drives the grid of tube 12 negative, increasing the potential of the anode of tube 12 due to the reduced current in resistor 14, and this in turn, due to the coupling condenser 18, drives the grid of tube 11 more positive. Since this chain of events was started by the grid of tube 11 going positive and ends by causing the grid of tube 11 to go more positive it is seen that the operation of tube 11 is such as to accelerate its grid in its positive swing until limited by grid current. As a result the positive swing of the grid of tube 11 through the region of conduction is very rapid, and at the same time the grid of tube 12 is likewise driven rapidly negative to a value far beyond cutoff. Upon readjustment of the voltage across condenser 17 in a discharge circuit comprising elements 11, 13, 200 and 16, the grid of tube 12 returns positively and when conduction starts, a chain of events starts which drives the grid of tube 11 rapidly negative without grid current limitation.

As a result of the multivibrator operation, the grid of triode 21 which is connected to the grid of tube 11 abruptly changes from below cut off to cathode potential once per oscillator cycle, and abruptly changes from cathode potential to below cutoff also once per oscillator cycle, thereby tending to produce a current of square wave form with very abrupt sides in the plate resistor 23. With a 100 cycle multivibrator, for example, the space current through triode 21 can change from zero to maximum value in the order of 1 microsecond, and can change in the reverse sense in a similar very small period of time.

The time constant of the circuit comprising condenser 26, resistors 23 and 25, tube 21 and battery 200 is such that the condenser 26 adjusts itself to a change of plate current very rapidly. This is accomplished by choosing the values of resistors 23 and 25 and the capacity of condenser 26 to be suitably small. As a result, when the tube 21 suddenly passes its maximum current the potentials of both ends of condenser 26 are driven suddenly negative, carrying with it the grid of tube 22 as shown in Fig. 4. But condenser 26 rapidly discharges to its new lowered equilibrium voltage allowing the grid of triode 22 to return to ground potential. That is, a negative pulse of short duration, say the order of 15 microseconds is produced on the grid of triode 22 immediately as the result of tube 11 starting to pass current. A half cycle later (assuming a symmetrical oscillatory circuit), when tube 12 suddenly passes current, the grid of tube 21 is driven negatively, tending to produce a positive pulse on the grid of tube 22, but this is minimized by the current flow to the grid of tube 22, and the increased speed of readjustment of the voltage of condenser 26. As a result, a positive pulse of short duration is impressed from the plate circuit of tube 22 upon the output condenser 27, followed a half cycle later by a smaller negative pulse. These positive pulses are subsequently utilized, but the negative pulses are subsequently suppressed.

A circuit 120 including triodes 121 and 122 and output condenser 127 is similar to the circuit 20 above described, and the grid voltage on tube 122 is shown in Fig. 6. The corresponding parts have been given similar reference numbers but increased by 100 to avoid duplicating the description thereof.

The operation of circuit 120 driven from the grid of tube 12 is similar to that of circuit 20, resulting in a positive pulse of short duration impressed on output condenser 127. The positive pulses on condensers 27 and 127 are alternate however as they are derived from opposite potential positions of the multivibrator circuit 10.

It should be noted that differences in multivibrator tube characteristics (shown in Figs. 2 and 3), are compensated by the limiting action of circuits 20 and 120 (as shown in Figs. 4 and 6).

The output of circuit 20 is impressed through the output condenser 27 upon an artificial line comprising inductors 28 in series with suitable mutual inductance between successive inductor elements, condensers 29 connected across the input and output of the inductor elements to a ground lead 212 and condensers 30 connected from junctions of the inductor elements to ground lead 212. This line is terminated with a resistor 31 connected across the output condenser 29. The number of sections of this line may be many more than here shown. This line is so designed that a pulse, shown in Fig. 5, entering from condenser 27 is transmitted along the line and absorbed in the terminating resistor 31, creating voltage pulses at points 33, 34 and 35 of substantially the same characteristics but with centers of the pulses at points 33, 34 and 35 occurring substantially 50, 100 and 150 microseconds later, respectively, than the center of the pulse at input point 32. The first section of the line is provided in part to insure similarity of the first pulse of the series to the later pulses. The construction and operation of the line operated from the output of tube 122 is similar to that from the output of tube 22 and has been given similar reference numbers but increased by 100. The voltage on capacitor 129 is shown in Fig. 7.

For selecting the time delay for operations for which a pulse on frequency $f_1$ is to be radiated first, and a later pulse is to be radiated on frequency $f_2$, three double pole single throw switches are supplied, operatively connected to transmission line points 32, 33, 34 and 35 by conductors including resistors 36, 37, 38 respectively. These switches may in practice constitute the output devices of magnetic relays operated by remote control push buttons, but are here shown in simplest possible form. One of the movable blades of each switch, terminated at points 39, 40 and 41, is connected through resistor 36 to initial pulse point 32. The other blades of the three switches are individually connected from terminals 42, 43, 44 to the later points 33, 34, 35 on the transmission line through individual resistors 37, 38 and a direct connection respectively. The drawing shows switch R closed for establishing "right" operation with the pulse on channel $f_2$ delayed 50 microseconds behind that on $f_1$. Switches L (left) and F (flash) are open.

The output switch terminals 45, 46, 47 are joined in parallel by bus bar 51 and also the terminals 48, 49, 50 are joined in parallel by bus bar 52. Similar connections are made for the switches U, D and S for operations "up," "down" and "secure," designated by numbers 100 greater than for switches for operations R, L and F.

It is apparent that a pulse will be established across from bus bar 51 to ground for the initial pulse regardless of which switch R, L or F is closed, as shown in Fig. 8, but that a pulse will be established selectively from bus bar 52 to ground at a later time with the amount of delay determined by the choice of switch, as shown in Fig. 9.

Clipping and combining tubes 53 and 54 are for providing pulses for channel $f_1$ and similarly purposed tubes 153 and 154 for channel $f_2$. Tubes 53 and 54 are shown as triodes with their plates connected together and their cathodes connected together, and with their grids connected through resistors 55 and 56 respectively to a ground lead 213. The tubes 153 and 154 and resistors 155 and 156 are similarly connected. The grid of tube 53 is joined to bus bar 51 to be driven by the undelayed pulses, shown in Fig. 8, corresponding to operations R, L and F, and the grid of tube 54 is connected to the bus bar 152 to be driven by the delayed pulses, shown in Fig. 9, for operations U, D, S. The grids of tubes 153 and 154 are correspondingly connected to bus bars 151 and 52, to receive the delayed and undelayed pulses, shown in Figs. 10 and 11, respectively, for the operation of channel $f_2$. The cathodes of all four tubes 53, 153, 54, 154 are joined together, and are connected through resistor 201 to line 214a connected to the positive end of battery 200, and through resistor 202 paralleled by bypass condenser 203 to the grounded lead 213. Output resistors 57 and 157 are connected from the positive lead 214a to the paralleled plates of tubes 53 and 54, and the paralleled plates of tubes 153 and 154 respectively.

In the operation, the constants are so chosen that the tubes 53, 153, 54, 154 are all biased beyond cutoff due to the current flow through resistor 201 and resistor 202 to ground. Therefore these tubes will be actuated only in response to those parts of the voltage pulses delivered through the switches which have instantaneous values above a predetermined amount as shown by the clipping levels of Figs. 8 to 11. In this manner undesired parts of the wave form including the negative pulses on the transmission lines are suppressed, and only pulses with flat bases subsequently appear in the output resistor. Thus a negative pulse with base line at the positive voltage value of battery 200 is produced in the plate resistor 57 both from the initial pulse at point 32 due to closure of switch R, and from the delayed pulse from point 134 due to closure of switch D. Similar pulses for channel $f_2$ are developed in the plate resistor 157. The values of the resistors 36, 37, 38, 136, 137, 138 are so chosen that the width of the pulses appearing in resistors 57 and 157 are substantially the same regardless of the point on the pulse delay circuit from which the pulse is derived.

The plates of tubes 53 and 54 are connected through condenser 59 to the grid of triode 61 which is in turn connected to a ground lead 214 through a resistor 63. The cathode of tube 61 is connected to ground lead 214, the plate is connected through resistor 65 to lead 215 connected to the positive end of battery 200, also through condenser 67 to a resistor 69 the other end of which is connected to ground lead 214, and a resistor 71 the other end of which is connected to the grid of a triode 75, and also to the anode of a diode 73 the cathode of which is connected by a line 216 to the positively biased cathodes of clipper combiner tubes 53 and 54. The plate of triode 75 is connected through a resistor 77 to the positive lead 215 and also through a condenser 81 to a negative pulse terminal 85. The cathode of triode 75 is connected through a resistor 79 to ground lead 214 and also through a condenser 83 to a positive pulse terminal 87. The amplifier for channel $f_2$ is similarly arranged as above stated with parts given corresponding reference numbers increased by 100.

In operation, the negative voltage pulses in plate resistor 57 for operation of channel $f_1$ are impressed upon the grid of triode 61, and amplified and positive pulses are impressed from the plate of tube 61 upon the limiter 73 which limits the voltage impressed upon triode 75 to the peak value determined substantially by the voltage drop in the positive biasing resistor 202. By use of the tube 75 these positive pulses are amplified to produce a negative voltage pulse at high impedance at terminal 85 and a positive voltage pulse at terminal 87, shown in Fig. 12, either of which may be utilized as may be desired for operation of the radio transmitter for channel $f_1$. Similar pulses are produced at terminals 185 and 187, shown in Fig. 13, for actuating transmitter channel $f_2$.

The terminals 85 or 87 are connected to modulate a radio transmitter which is operating on frequency $f_1$ so that pulses corresponding to the pulses at the terminals 85 or 87 are propagated by that transmitter. Similarly the terminals 185 or 187 are connected to modulate a transmitter operating on the frequency $f_2$.

Thus when switch R is closed as shown, an undelayed pulse $a$ derived from point 32 is fed through tubes 53, 61 and 75 to terminal 85 or 87 to be propagated on channel $f_1$ followed in 50 microseconds by a pulse $b$ derived from point 33 which is fed through tubes 154, 161 and 175 to terminal 185 or 187 to be propagated on the channel $f_2$, as shown in Fig. 14. If switch L or F is closed instead of the switch R the same sequence will occur but the delay will be 100 or 150 microseconds respectively. These two pulses will be repeated at the frequency of the multivibrator 10.

With the switch D closed as shown, an undelayed pulse derived from the point 132 is fed through the tubes 153, 161 and 175 to the terminals 185 and 187 to be propagated on the channel $f_2$ followed in 100 microseconds by a pulse derived from the point 134 which is fed through the tubes 54, 61 and 75 to be propagated on the channel $f_1$. With the switches U or S closed instead of the switch D the same sequence will occur except that the pulses will be separated by 50 or 150 microseconds respectively. These pairs of pulses will also be repeated at the frequency of operation of the multivibrator 10. However, they will be interleaved between the first pairs of pulses because they are derived from an opposite potential point on the multivibrator.

A receiver of the type described in my copending application above mentioned may be used to receive the pulses and will be selective of the two pulse sequences to actuate the corresponding control circuits. The two selected controls may thus be operated simultaneously as above described.

Although a specific embodiment of the invention has been set forth for purposes of illustration it is to be understood that various changes and modifications may be made as will be apparent to a person skilled in the art. The invention is only to be restricted in accordance with the following claims.

What is claimed is:

1. In a multiplex interleaved control system, the improvement comprising a pulse forming circuit to form two series of recurrent pulses with the pulses of the two series occurring alternately, a separate delay circuit fed by each series of pulses having output terminals pulsed in predetermined time sequence to form recurrent pairs of pulses corresponding to the individual pulses of each series, a pair of transmission channels, and means supplying the individual pulses of each pair to the respective channels.

2. In a multiplex interleaved control system, the improvement comprising a pulse forming circuit to form two series of recurrent pulses with the pulses of the two series occurring alternately, a separate delay circuit fed by each series of pulses having output terminals pulsed in predetermined time sequence to form recurrent pairs of pulses corresponding to the individual pulses of each series, a pair of transmission channels, means supplying the individual pulses of each pair to the respective channels, and means controlling the sequence of the pulses of each pair on the two channels.

3. In a multiplex interleaved control system, the improvement comprising a pulse forming circuit to form two series of recurrent pulses with the pulses of the two series occurring alternately, a separate delay circuit fed by each series of pulses having output terminals pulsed in predetermined time sequence to form recurrent pairs of pulses corresponding to the individual pulses of each series, a pair of transmission channels, means controlling the timing of the pulses of each recurrent series of pairs, and means supplying the individual pulses of each pair to the respective channels in opposite time sequence.

4. In a multiplex interleaved control system, the improvement comprising a pair of delay circuits, means pulsing the inputs of the delay circuits at the same rate of recurrence but at alternate times, the interval between successive pulses being greater than the maximum time delay of said delay circuits, a pair of transmission channels, and means pulsing each channel from selected points on each delay circuit.

5. In a multiplex interleaved control system, the improvement comprising a pair of delay circuits, means pulsing the inputs of the delay circuits at the same rate of recurrence but at alternate times, the interval between successive pulses being greater than the maximum time delay of said delay circuits, a pair of transmission channels, means pulsing each channel from selected points on each delay circuit, and control means to select the points in accordance with the desired time sequence of said pulses.

6. In a multiplex interleaved control system, the improvement comprising a pair of pulse delay circuits, an oscillator circuit to produce a series of pulses at a predetermined rate having a pair of output points at which said pulses occur alternately, means supplying pulses from each point to one of said delay circuits so that successive pulses progress through alternate delay circuits, a pair of transmission channels, and selective means connecting each channel to be fed by pulses from selected points on each delay circuit.

7. In a multiplex interleaved control system, the improvement comprising a pulse forming circuit to form two series of recurrent pairs of pulses with the pairs of pulses of the two series occurring alternately, selector means controlling the time delay between the pulses of each pair of each series, a pair of transmission channels, and means supplying the individual pulses of each pair in one series to the respective channels in a predetermined sequence and means supplying the individual pulses of each pair in the other series to the respective channels in the opposite sequence.

8. The method of deriving pulses for multiplex control which comprises producing two series of recurrent pairs of pulses with the pairs of pulses of the two series occurring alternately, controlling the time spacing between the pulses of each pair in each series, propagating the individual pulses of each pair of one series over separate transmission channels in a given sequence and propagating the individual pulses of each pair of the other series over said transmission lines in the opposite sequence.

9. The method of deriving pulses for multiplex control which comprises producing two series of recurrent pairs of pulses with the pairs of pulses of the two series occurring alternately, controlling the time spacing between the pulses of each pair in each series, and propagating the individual pulses of each pair over separate transmission channels.

10. The method of deriving pulses for multiplex control which comprises producing two series of recurrent pairs of pulses with the pairs of pulses of the two series occurring alternately, controlling the time spacing between the pulses of each pair in each series, propagating the individual pulses of each pair over separate transmission channels, and utilizing the transmitted pulses of each series in accordance with their sequence for selective control.

ELLISON S. PURINGTON.

REFERENCES CITED

The following references are of record in the file of this patent:

UNITED STATES PATENTS

| Number | Name | Date |
| --- | --- | --- |
| 2,009,946 | Powell | July 30, 1935 |
| 2,349,810 | Cook | May 30, 1944 |

FOREIGN PATENTS

| Number | Country | Date |
| --- | --- | --- |
| 132,453 | Austria | Mar. 25, 1933 |